No. 783,317. PATENTED FEB. 21, 1905.
A. D. SALSMAN.
PITCHFORK.
APPLICATION FILED MAY 26, 1904.
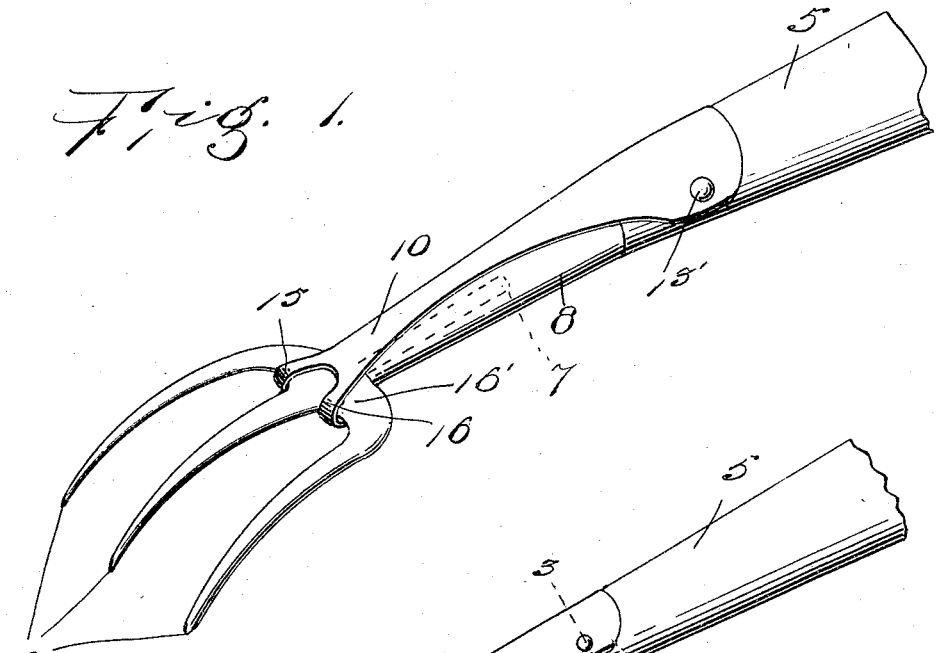
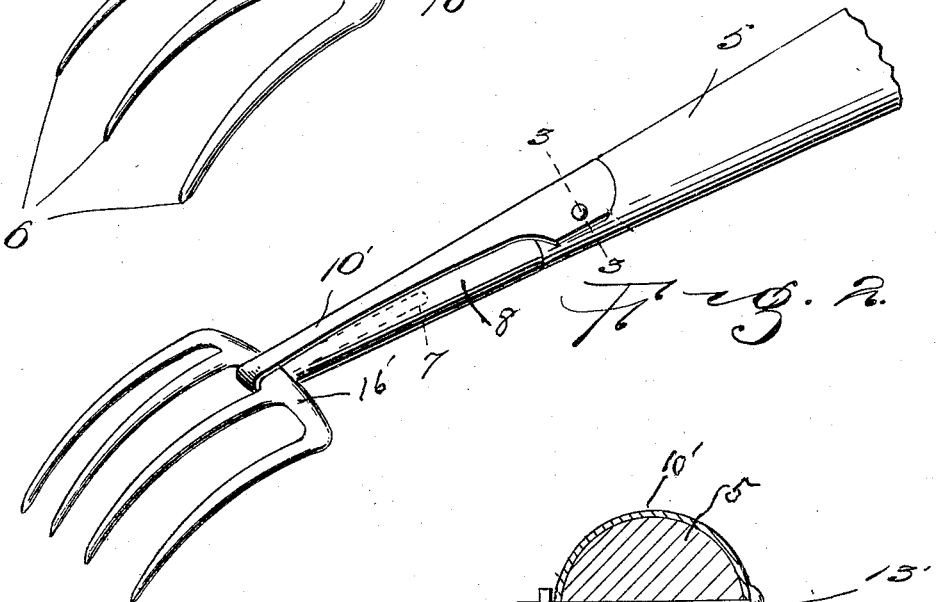
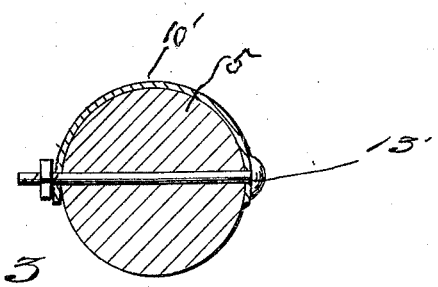

No. 783,317. Patented February 21, 1905.

UNITED STATES PATENT OFFICE.

ANDREW D. SALSMAN, OF CARRINGTON, NORTH DAKOTA.

PITCHFORK.

SPECIFICATION forming part of Letters Patent No. 783,317, dated February 21, 1905.

Application filed May 26, 1904. Serial No. 209,932.

*To all whom it may concern:*

Be it known that I, ANDREW D. SALSMAN, a citizen of the United States, residing at Carrington, in the county of Foster, State of North Dakota, have invented certain new and useful Improvements in Pitchforks; and I do hereby declare the following to be a full, clear, and exact description of the invention, such as will enable others skilled in the art to which it appertains to make and use the same.

This invention relates to pitchforks; and it has for its object to provide means for preventing accidental disengagement of the shank of the tines from the handle, while permitting them to be easily removed when desired.

In the drawings forming a portion of this specification, and in which like numerals of reference indicate similar parts in the several views, Figure 1 is a view showing a pitchfork having a retaining attachment embodying the present invention. Fig. 2 is a perspective view showing the modification. Fig. 3 is a section on line 3 3 of Fig. 2.

Referring now to the drawings, there is shown a pitchfork comprising the usual handle 5, having three tines 6 at one end, provided with a stem 7, which is engaged in the end of the handle, the latter being provided with the ordinary ferrule 8. In connection with the pitchfork there is employed a retaining device consisting of a plate 10, having one end portion thereof broadened and bent laterally into semicylindrical form, as illustrated, this broadened end portion fitting half-way around the handle 5, to which it is connected by screws or a bolt 13', on which it is pivotally movable for a purpose to be presently explained. The broadened end of the plate 10 may be termed the "rear" end thereof, and the opposite or forward end is broadened slightly and bifurcated to form fingers 15 and 16, which are curved downwardly so as to engage over the metal portion of the fork that connects the tines, this metal portion, which may be termed the "head" of the fork, being shown at 16'.

In practice after the tines are connected with the handle and the retaining device is pivotally connected thereto said device is adjusted to engage its fingers over the head of the fork at opposite sides of the middle or central tine of the fork, which latter fits snugly between the fingers. The retaining device being of spring metal, the ends of the fingers are sprung over the head of the fork, and the retaining device cannot be swung out of engagement with said head excepting by first springing the fingers, the resistance of the fingers being sufficient to prevent accidental disengagement. When, however, it is desired to remove the tines for substitution of others or for any other reason, the retaining device may be readily swung out of active position, as will be understood.

In Fig. 3 of the drawings there is shown a second form of the invention, in which the forward end of the plate 10' is bent into hook form, but is not bifurcated to form spaced fingers. This form of the device is designed for use in connection with a fork having an even number of tines and in which there is no middle tine. The retaining device shown in Fig. 3 has the same general shape as that shown in Fig. 2. It is secured to the handle of the fork in the same manner. It is swung into and out of active position in the same way, and its operation is the same.

In practice other modifications may be made and any suitable material may be used without departing from the spirit of the invention.

What is claimed is—

1. The combination with a pitchfork, of a retaining device comprising a plate having a hook at one end removably engaged with the head of the fork and having its opposite end broadened and bent part way around the handle of the fork and pivoted thereto.

2. The combination with a pitchfork, of a retaining device comprising a plate having fingers at its forward end bent into hook shape and engaged removably with the head of the fork at opposite sides of a tine, said plate having its opposite end broadened and bent part way around the handle of the fork and pivoted thereto, said retaining device being movable upon its pivot to engage and disengage the fingers with respect to the head of the fork.

In testimony whereof I affix my signature in presence of two witnesses.

ANDREW D. SALSMAN.

Witnesses:
L. K. ESTABROOK,
J. LEMERT.